R. D. JOHNSTON, Jr.
SWITCH OPERATING MECHANISM.
APPLICATION FILED JAN. 17, 1911.
1,005,226.
Patented Oct. 10, 1911.
2 SHEETS—SHEET 1.
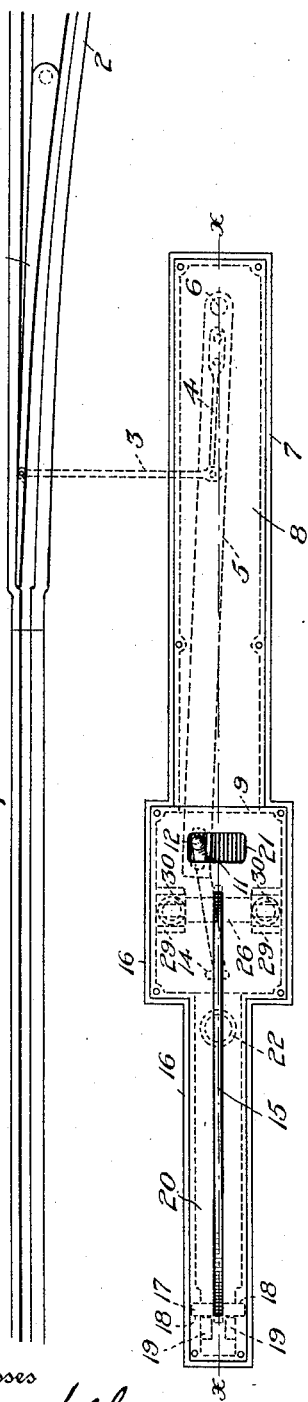
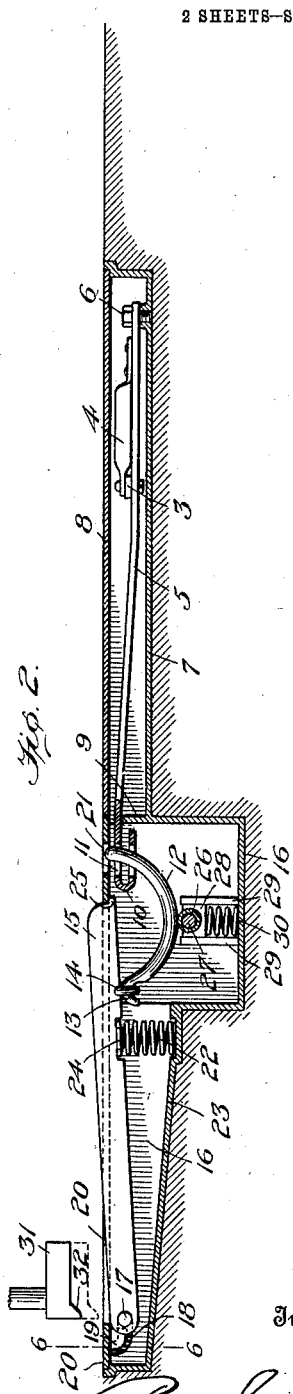

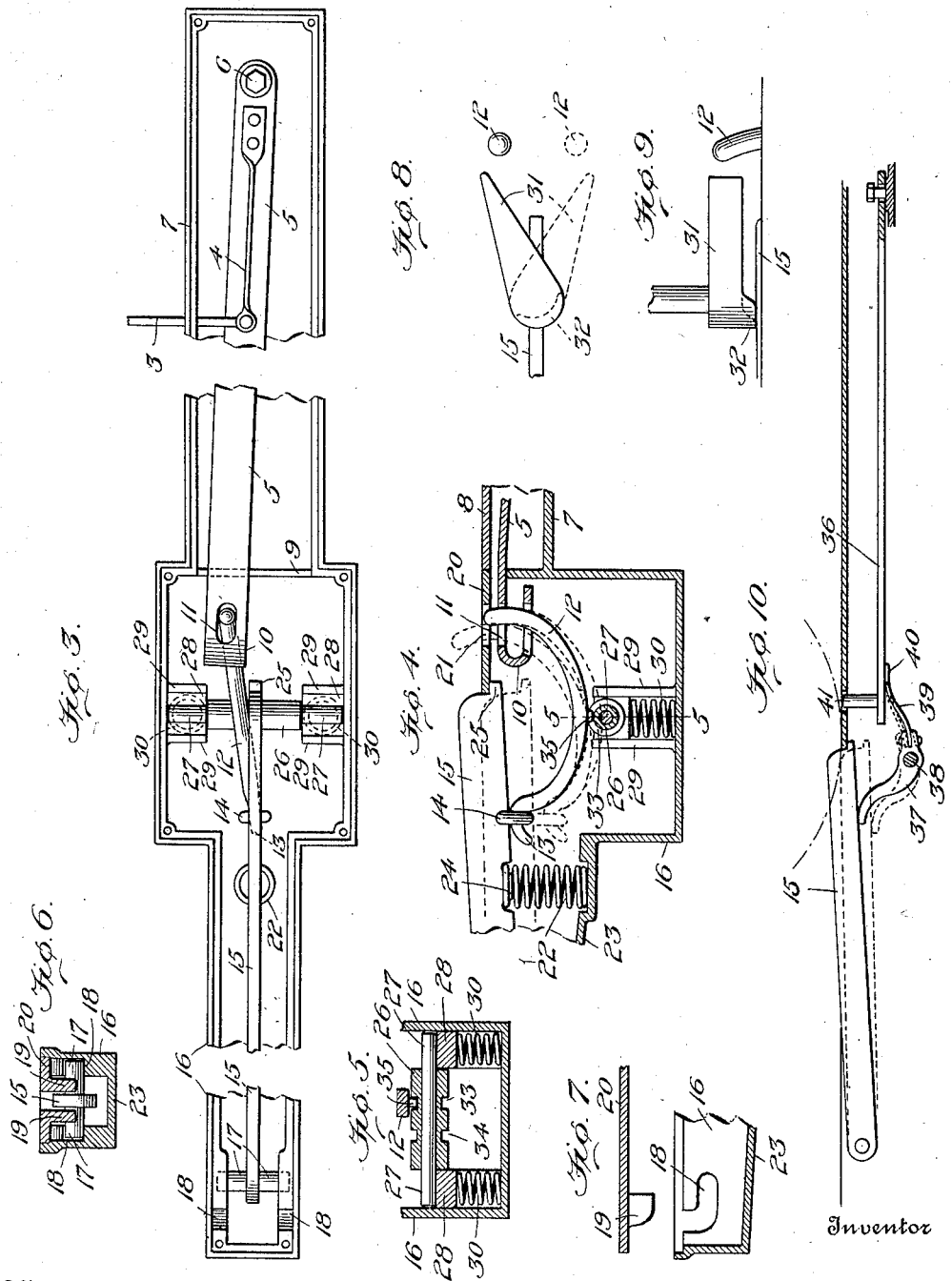

UNITED STATES PATENT OFFICE.

ROBERT D. JOHNSTON, JR., OF BIRMINGHAM, ALABAMA.

SWITCH-OPERATING MECHANISM.

1,005,226.  Specification of Letters Patent.  Patented Oct. 10, 1911.

Application filed January 17, 1911. Serial No. 603,071.

*To all whom it may concern:*

Be it known that I, ROBERT D. JOHNSTON, Jr., a citizen of the United States, residing at Birmingham, in the county of Jefferson and State of Alabama, have invented new and useful Improvements in Switch-Operating Mechanism, of which the following is a specification.

My invention relates to mechanism for operating switches by means of an actuator carried by a car or train and controlled by the motorman or train man so that the switch can be positively and automatically thrown into the position desired without stopping the car or train.

More particularly, my invention relates to that type of switch operating mechanism which is traffic protected and contemplates the use of a retractable pin which, when it is desired to throw the switch, can be projected into the path of the actuator on the car and adjusted thereby to shift the switch point operating mechanism, the pin normally being below the street surface and either mounted on or in operative engagement with the parts that throw the switch point.

The chief object of my invention is to adapt my mechanism to be set for operation by a part of the car or train other than the car wheels, so that the track rails are left clear and no parts of the switch mechanism will be actuated by each passing wheel, whether the switch be properly set or not.

A further object is to simplify the mechanism by using the car actuator to both elevate the pin and shift it in the direction it is desired to throw the switch.

A further object is to provide means to effectively protect the pin and the parts for elevating same from liability to being broken by the street traffic. I prefer to avoid setting the trip plate for lifting the pin in a slot in the track to protect it from passing wheels, as that arrangement complicates the construction of the actuator, and in my opinion presents difficulties greater than the providing of yielding means for preventing breakage should a wagon wheel simultaneously rest on the trip plate and the pin which the latter is urging toward its elevated position. Any form of pin, pin support, or pin actuating means may be used, provided they permit of the pin being lifted by parts other than the car wheel, and the yielding means may be any such as will absorb the thrust of a wagon wheel which happens to simultaneously strike the pin and its elevating mechanism. I prefer to use a solid curved pin separate from the parts actuated thereby and directly connected to a depressible trip plate which shifts it bodily in an arcuate direction over a yielding support, or I may use a pivoted angled pin or pin supporting lever, and introduce a spring to permit the pin or pin supporting lever to give under the conditions stated, or other similar equivalent means may be employed.

A further object is to provide a novel means for locking the mechanism in its adjusted positions.

My invention further comprises the details of construction and arrangement of parts which, without limiting myself specifically thereto, I have presented as the preferred embodiments of my invention and illustrated in the accompanying drawings, in which:—

Figure 1 is a top plan view of my improved switch mechanism. Fig. 2 is a longitudinal sectional view taken along the line $x-x$ of Fig. 1. Fig. 3 is an enlarged plan view of the trip mechanism with the cover plates removed. Fig. 4 is a detail view showing several operating positions of the pin and its trip lever, together with a lock for the parts being shown in this view. Fig. 5 is a sectional view taken along the line 5—5 of Fig. 4. Fig. 6 is a detail view of the end bearing for the pin trip plate taken along the line 6—6 of Fig. 2. Fig. 7 is a detail view of the end of the bearings in the end of the box of the trip plate. Fig. 8 is a detail plan view, and Fig. 9 a side elevation of the actuator on the car in its operating position with reference to the pin and its trip plate. Fig. 10 is a detail view in side elevation of a modified construction in which the pin is fixed to the shifting lever which actuates the switch point.

Similar reference numerals refer to similar parts throughout the drawings.

I have illustrated my invention as adapted to actuate a switch point 1 which acts to direct the cars from the main tracks 1, 1 to the side track 2, the tracks and switch point being of standard construction. A rod 3 connects the point near its forward end to the free end of a spring 4 which is connected at its other end to a lever 5. The lever is pivotally connected by a pin 6 to the bottom of a narrow casing 7 which is set in the pavement with its top flush with the surface thereof and normally closed by a cover plate 8. The forward end of the lever 5 projects through a slot in the end wall 9 of casing 7, resting upon said wall and adapted to slide from left to right over same a sufficient distance to throw the point 1. The forward end of the lever is bent back on itself to form the end portion 10, and a slot 11 extends down through the portion 10 of the lever and receives the free end of a curved pin 12, the rear end of which is formed with a hook 13 that engages loosely with an eye 14 that is suspended from a depressible trip plate 15. The trip plate and pin 12 are mounted in a box 16 which, if desired, may be formed as a part of the casing 7. The central portion of the casing 16 is widened, as shown in Fig. 1, and it is into this portion of the casing that the end 10 of the lever 5 projects. The trip plate 15 is provided at one end with trunnion bearings 17 which are adapted, as seen in Figs. 6 and 7, to drop down into an angled slot 18 formed in the side walls of the contracted end of the casing 16, which slots permit the trunnions to drop readily therein and, after assuming their proper position, to be held therein against displacement by lugs 19 carried by a cover plate 20, which covers the box 16, leaving however a slot for the trip plate 15 and an opening 21 of sufficient width to permit the play of the pin 12 throughout its operating movements. A coiled spring 22 rests on the floor 23 of the casing 16 in a suitable bearing recess and at its upper end engages a lug 24 on the bottom of the trip plate 15. This plate projects above the top of the casing 20 and presents a gradually rising surface, which is parallel with the rails 1, being normally held in elevated position by the action of the spring 22, which presses a lip 25 at the free end of the plate against the cover plate 20 and arrests the upward movement of the plate.

The pin 12, as illustrated in Figs. 1 to 3, may be formed as a round steel pin bent on a curve and adapted to be supported by resting upon a roller 26 which rotates upon a shaft 27, the ends of which are supported in bearing plates 28 which are vertically adjustable in guides 29 formed integral with the casing and adapted to receive each a coil spring 30 which tends to urge the bearing and roller upwardly. The tension of these springs will hold the roller support or fulcrum for the pin against depression under ordinary operating conditions.

The car (not shown) is provided with a depressible and angularly adjustable actuator or foot piece 31 which is preferably operated by mechanism such as forms the subject-matter of Letters Patent No. 945,621, issued to Harold Shemwell. In order to simplify mechanism I prefer to use this foot piece to depress the trip plate 15 and for this purpose I provide it at or near its rear end with a downwardly disposed rib or shoulder 32 which has its forward surface sloping away from the point of the foot piece so as to present an inclined bearing rib which will engage the inclined top edge of the trip plate 15 and gradually force the same down to elevate the pin into position to be engaged by the foot piece proper, as seen in Figs. 8 and 9.

Any suitable locking mechanism may be used to lock the arm 5 in either of its operating positions. Forms of this locking mechanism are disclosed in the United States Letters Patent to Matthew S. Farmer, No. 945,156, and in a pending application to Harold Shemwell, Serial No. 573,845, and renewed on the 19th day of August, 1910, and I have in connection with Figs. 4 and 5, illustrated a locking arrangement which is particularly adapted for use in connection with the curved pin 12, which arrangement consists in providing two grooves 33 and 34 in the roller 26 and providing the pin 12 with a downward projection 35 which, when the pin is in its lowered position, will engage in one or the other of said grooves and prevent the lateral shifting of the pin and accordingly the arm 5 and the switch point. When, however, the trip plate 15 is depressed, the pin 12 moves forward bodily and the projection 35 clears the groove when the pin is free to be shifted laterally from one side to the other by the foot piece 31, and upon resuming its lowered position, the projection 35 will engage in one or the other of the grooves. When this form of lock is used I prefer to make the pin with a flattened cross-section at the middle having a width greater than the grooves so that it will slide over same without engaging therein.

I have illustrated in Fig. 10 the adaptation of my invention to a mechanism in which the pin, which the foot piece is adapted to engage, is mounted upon the arm 36 corresponding to the arm 5 but adapted in this case to be elevated by a crank 37 pivoted at 38 and having one end thereof in engagement with the trip plate and its other end connected to a spring 39, the free end of which is widened at 40 to receive and slidingly support the forward end of the arm 36, which arm, as it slides horizontally, remains in engagement with the portion 40 of the spring. The pin 41 on the arm will, when the trip plate 15 is depressed, be lifted into operating position, but if a wagon wheel simultaneously engages the trip plate and pin 41, the spring 39 will permit both parts to yield and prevent breakage.

Referring to Figs. 1 to 3, in operation the motorman or train man depresses the foot piece 31 and sets it at the desired angle. As the car passes over the casing 16, the lip 32 on the foot piece engages the trip plate 15 and gradually forces the latter down to the dotted line position shown in Fig. 4. This downward movement causes the pin 12 to slide over the roller 26 as its fulcrum until the free end of the pin works up through the slot 11 in the end 10 of the arm 5 and projects in the path of the foot piece, as seen in Figs. 8 and 9. The side wall of the foot piece engages and throws the pin to the right or the left, according to its position, and this movement of the pin, by means of its engagement with the arm 5, shifts the latter to move the switch point. If the latter is blocked, the spring 4 absorbs the movement and prevents breakage. If a wagon wheel moves along the trip plate 15 to the right, Fig. 2, and throws the pin 12 up, the latter will present its end at the angle shown in Fig. 9, so that if the wheel strikes it, while still engaging the trip 15, it will have no further effect than to force the pin downwardly, which movement is permitted by the yielding of the springs 30. Likewise if a wheel moves in a reverse direction and stands over the pin 12, as it strikes the curved end of the trip plate 15, the latter will give due to the action of springs 30.

I have described the manner in which the pin 12 may be locked to prevent split switches. The yielding movements of the pin require a slightly larger slot 21 for the pin 12 than would be required for the pin 41, but in the customary manner a loose slide plate (not shown) may be provided to maintain the opening closed against access of dirt into the box 16, the plate having a small opening through which the pin 12 works.

The construction of parts of my mechanism may be varied in many ways without departing from the spirit of my invention.

Having thus described my invention, what I claim as new and desire to secure by Letters Patent, is:—

1. Automatic switch-adjusting mechanism which includes a movable switch point, an arm connected to said point, a box to which said arm is movably connected and which has a slot therein adjacent to the free end of said arm, a normally depressed pin adapted to engage said arm and when elevated to project through said slot, depressible means disposed free of engagement with the car wheel and adapted to elevate said pin, and yielding means to provide for the simultaneous depression of both said depressible means and said pin, substantially as described.

2. Automatic switch-adjusting mechanism comprising a movable switch point, operating means therefor comprising a normally depressed member adapted to be elevated and actuated by a trip movable with the car, and yielding means to elevate said projection which means are disposed so as to clear the car wheels and are adapted to be actuated by a device movable with the car.

3. Automatic switch-adjusting mechanism comprising a movable switch point, a movable arm connected to said point, a pin operatively connected to said arm and disposed normally below the street surface, an adjustable device on the car, an element adapted to be engaged and operated by said device, and yielding means to transmit movement from said element to lift said pin into position to be engaged by a part movable with the car and shifted to move said point, substantially as described.

4. In a switch mechanism, the combination with a depressible element on a car, of a movable element in the track adapted to be engaged and actuated by said depressible element, a pin, switch point adjusting mechanism operatively connected to said pin, and means actuated by said movable element in the track to elevate said pin above the track and in position to engage an actuator on the car.

5. In an automatic switch operating mechanism, a member normally depressed and traffic protected, means to elevate said member, operating connections from said member to a switch point, and a depressible element on a car adapted to both engage said first mentioned means to elevate said member and to shift said member to move the point, substantially as described.

6. In an automatic switch operating mechanism, a member normally depressed and traffic protected comprising spring means to absorb the effort of said elevating means to lift said member when its upward movement is blocked, operating connections from said member to a switch point, and a depressible element on a car adapted to both engage said first mentioned means to elevate said member and to shift said member to move the point, substantially as described.

7. In an automatic switch operating mechanism, a member normally depressed and traffic protected, means to elevate said member, operating connections from said member to a switch point, a depressible element on a car adapted to both engage said first mentioned means to elevate said member and to shift said member to move the point, and spring means to permit said member to move to its depressed position after being raised and while its elevating means are in the position assumed when said member has been elevated thereby, substantially as described.

8. In an automatic switch operating mechanism, a switch point, a lever operatively connected to said point, and means to shift said lever, comprising an actuator on the car, a member adapted to be actuated thereby normally disposed below the surface of the track, means to move said member into position to be engaged by said actuator, and yielding means to support said member free of fixed connection thereto.

9. In an automatic switch operating mechanism, a switch point, a lever operatively connected to said point, and means to shift said lever, comprising an actuator on the car, a member adapted to be actuated thereby and having a curved bearing face normally disposed below the surface of the track, means to move said member bodily in an arcuate direction until its free end is in position to be engaged by said actuator, and yielding means to support said member free of fixed connections thereto.

10. In an automatic switch operating mechanism, a switch point, a lever operatively connected to said point, and means to shift said lever, comprising an actuator on the car, a member adapted to be actuated thereby and having a curved bearing face normally disposed below the surface of the track, means to move said member bodily in an arcuate direction until its free end is in position to be engaged by said actuator, and yielding means to support said member free of fixed connections thereto comprising a spring support and a roller bearing mounted thereon.

11. In an automatic switch operating mechanism, an arcuate member, a car actuated device adapted to engage and move said member bodily in an arcuate direction and into position to be engaged and shifted by the car, a fulcrum for said member, and means operated by said member to shift a switch point, substantially as described.

12. In an automatic switch operating mechanism, an arcuate member, a car actuated device adapted to engage and move said member bodily in an arcuate direction and into position to be engaged and shifted by the car, a yielding fulcrum for said member, and means operated by said member to shift a switch point, substantially as described.

13. In an automatic switch operating mechanism, a casing seated in the track-way, a pivoted lever mounted therein to swing horizontally, a connection from this lever to a switch point, a second lever mounted therein in line with said first lever and adapted to swing vertically, a member disposed in said casing and loosely connected to both levers, said member being normally within the casing which has a slot through which said member projects when the vertically swinging lever is depressed and in which it moves laterally, when actuated by the car, to shift said horizontally swinging lever, substantially as described.

14. In a switch mechanism, a depressible trip plate and horizontally swinging lever disposed between the track rails, a casing which covers the lever and is slotted to permit the trip plate to project therethrough, a curved pin loosely connected to said plate, a yielding fulcrum for the pin, said casing and lever having each an opening through which said pin passes, and means to connect said lever to a switch point, substantially as described.

15. In a switch mechanism, a fulcrum having two notches, a curved lever which rests thereon and has a projection which normally engages in a notch to prevent lateral movement of the lever, means to shift the lever bodily on its fulcrum to set it in operating position when its projection clears the notch, car actuated means to laterally shift the lever while in its operating position, and switch point operating means actuated by said lever, said projection engaging in one or the other notch after the lever completes its operating movement and assumes its inoperative position.

16. In a switch operating mechanism, the combination of a depressible and laterally adjustable actuator mounted to move with the car or train, said actuator having a pointed forward end and near the rear end a downwardly projecting portion, of a switch point and shifting means therefor adapted to be engaged by said actuator and both moved into operative position and actuated thereby to shift said switch point, substantially as and for the purposes described.

In testimony whereof I have hereunto set my hand in presence of two subscribing witnesses.

ROBERT D. JOHNSTON, Jr.

Witnesses:
MARGARET C. LUTKINS,
R. D. JOHNSTON.

Copies of this patent may be obtained for five cents each, by addressing the "Commissioner of Patents, Washington, D. C."